United States Patent
Hong

(10) Patent No.: US 12,185,343 B2
(45) Date of Patent: Dec. 31, 2024

(54) METHODS AND APPARATUSES FOR DETERMINING NETWORK ALLOCATION VECTOR, AND STORAGE MEDIA

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 230 days.

(21) Appl. No.: 17/860,616

(22) Filed: Jul. 8, 2022

(65) Prior Publication Data

US 2022/0346083 A1    Oct. 27, 2022

Related U.S. Application Data

(63) Continuation of application No. PCT/CN2020/071520, filed on Jan. 10, 2020.

(51) Int. Cl.
*H04W 72/51* (2023.01)
*H04W 72/0446* (2023.01)

(52) U.S. Cl.
CPC ....... *H04W 72/51* (2023.01); *H04W 72/0446* (2013.01)

(58) Field of Classification Search
CPC ... H04W 72/51; H04W 72/512; H04W 72/12; H04W 72/0446; H04W 72/044; H04W 72/0453; H04W 72/0457; H04W 8/22
See application file for complete search history.

(56) References Cited

U.S. PATENT DOCUMENTS

| | | |
|---|---|---|
| 2014/0064257 A1 | 3/2014 | Fontaine et al. |
| 2014/0161064 A1 | 6/2014 | Jafarian et al. |
| 2019/0200214 A1 | 6/2019 | Liu et al. |

(Continued)

FOREIGN PATENT DOCUMENTS

| | | |
|---|---|---|
| CN | 102149222 A | 8/2011 |
| CN | 108377573 A | 8/2018 |

(Continued)

OTHER PUBLICATIONS

Intellectual property India, Office Action Issued in Application No. 202247044038, Nov. 25, 2022, 7 pages. (Submitted with Partial Machine Translation).

(Continued)

*Primary Examiner* — Ian N Moore
*Assistant Examiner* — Brian T Le
(74) *Attorney, Agent, or Firm* — Volpe Koenig

(57) ABSTRACT

Disclosed in the embodiments of the present disclosure are a method and an apparatus for determining a network allocation vector under multi-link communication situations, and a storage medium. The method for determining the network allocation vector under multi-link communication situations is applied to a first device, and the method includes: generating a first data frame for a first link in a plurality of links, wherein the plurality of links includes the first link; obtaining a capability information value of a second device in the plurality of links; setting a network allocation vector of the first device for the first link according to a capability information value of the first device and the capability information value of the second device.

15 Claims, 3 Drawing Sheets

(56) References Cited

U.S. PATENT DOCUMENTS

2020/0059791 A1 2/2020 Yang et al.
2020/0186305 A1 6/2020 Han et al.
2021/0329698 A1* 10/2021 Jang ..................... H04W 80/02

FOREIGN PATENT DOCUMENTS

| CN | 108810879 A | 11/2018 |
|----|-------------|---------|
| CN | 109391455 A | 2/2019 |
| WO | 2016/049886 A1 | 4/2016 |
| WO | 2017/101617 A1 | 6/2017 |
| WO | 2017/111448 A1 | 6/2017 |

OTHER PUBLICATIONS

ISA State Intellectual Property Office of the People's Republic of China, Written Opinion of the International Searching Authority Issued in Application No. PCT/CN2020/071520, Oct. 21, 2020, WIPO, 7 pages.
ISA State Intellectual Property Office of the People's Republic of China, International Search Report Issued in Application No. PCT/CN2020/071520, Oct. 21, 2020, WIPO, 4 pages.
European Patent Office, Extended European Search Report Issued in Application No. 20911503.9, Jul. 11, 2023, Germany, 5 pages.

* cited by examiner

METHODS AND APPARATUSES FOR DETERMINING NETWORK ALLOCATION VECTOR, AND STORAGE MEDIA

CROSS REFERENCE TO RELATED APPLICATIONS

This application is a continuation application of International Application No. PCT/CN2020/071520 filed on Jan. 10, 2020, the entire contents of which are incorporated herein by reference.

TECHNICAL FIELD

The present disclosure relates to communication technologies, in particular to methods and apparatuses for determining a network allocation vector under a multi-link communication, and storage media.

BACKGROUND

To improve throughput of a system, in Institute of Electrical and Electronics Engineers (IEEE) 802.11be, some devices may support simultaneous sending and receiving (receiving and sending through a plurality of links do not interfere with each other), some devices may only support sending or receiving through multi-links (a plurality of links), and some devices may only support receiving or sending through single-link (a single link).

In the related art, a method for ensuring mutual non-interference in communication is proposed for the situation in which there are devices with the above described capabilities in a Basic Service Set (BSS). The devices determine whether sending can be performed on a physical layer based on a channel energy detection (ED) mechanism, and determine whether sending can be performed on a Media Access Control (MAC) layer based on a Network Allocation Vector (NAV) mechanism. When an ED value is greater than or equal to a threshold, the NAV is set to be busy, and random backoff is performed. When the ED value is less than the threshold, the NAV is set to be idle, and sending is performed.

However, the above method only provides the setting of the NAV under single-link communication situations. Under multi-link communication situations, there is no feasible solution for the problem of how to realize that devices do not interfere with each other in communication.

SUMMARY

The present disclosure provides a method and an apparatus for determining a network allocation vector in a situation in which there are devices with multi-link communication capabilities in a BSS, and a storage medium.

According to a first aspect of the embodiments of the present disclosure, there is provided a method for determining a network allocation vector, applied to a first device, the method includes:

generating a first data frame for a first link in a plurality of links, where the plurality of links includes the first link;

obtaining a capability information value of a second device in the plurality of links;

setting a network allocation vector of the first device for the first link according to a capability information value of the first device and the capability information value of the second device.

According to a second aspect of the embodiments of the present disclosure, there is provided an apparatus for determining a network allocation vector, including:

a processor;

a memory configured to store instructions executable by the processor, wherein the processor is configured to implement the method for determining the network allocation vector according to any one of the foregoing solutions by executing the instructions.

According to a third aspect of the embodiments of the present disclosure, a computer storage medium having executable instructions stored thereon, after the executable instructions being executed by a processor, the method for determining the network allocation vector according to any one of the foregoing solutions can be realized.

It should be understood that the above general description and the following detailed description are exemplary and explanatory only, and do not limit the present disclosure.

BRIEF DESCRIPTION OF THE DRAWINGS

The accompanying drawings, which are incorporated into and constitute a part of the specification, illustrate embodiments consistent with the present disclosure, and together with the specification serve to explain the principles of the present disclosure.

DETAILED DESCRIPTION OF THE EMBODIMENTS

Figure 1:
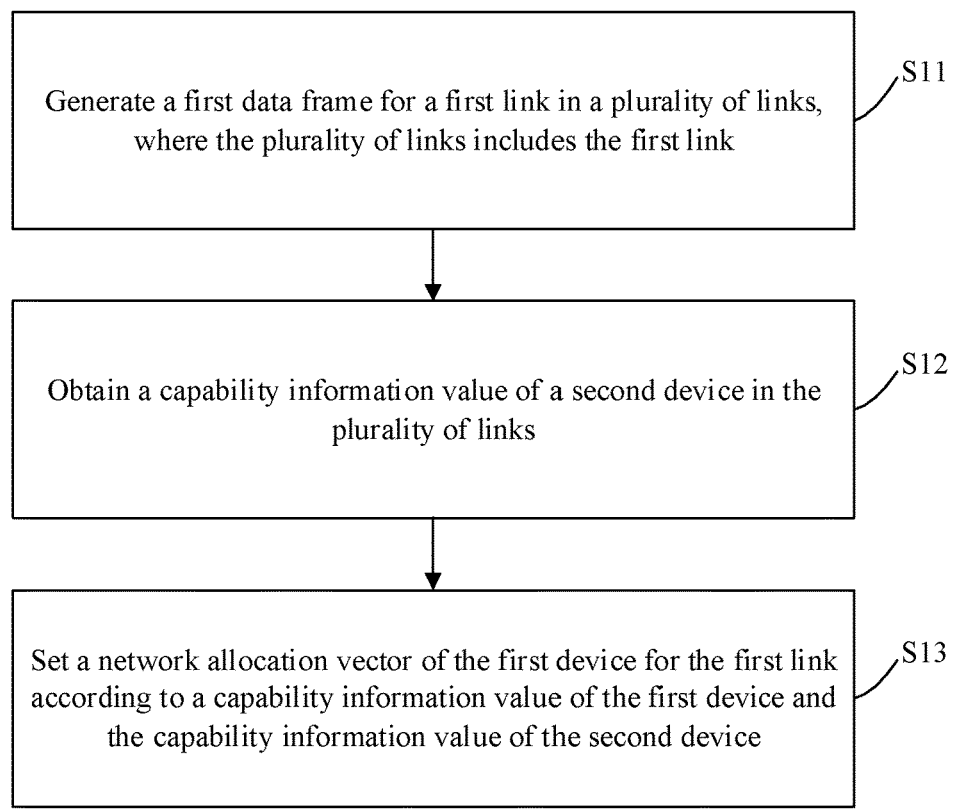
FIG. 1 is a flowchart illustrating a method for determining a network allocation vector according to an exemplary embodiment.

Exemplary embodiments will be described in detail herein, examples of which are illustrated in the accompanying drawings. When the following description refers to the drawings, unless otherwise indicated, the same numerals in different drawings indicate the same or similar elements. The embodiments described below do not represent all embodiments consistent with embodiments of the present disclosure. Rather, they are merely examples of apparatus and method consistent with some aspects of the embodiments of the present disclosure, as recited in the appended claims.

Terms used in the embodiments of the present disclosure are for the purpose of describing specific embodiments only, and are not intended to limit the present disclosure. The singular forms "a", "an" and "this" used in the embodiments of the present disclosure and the appended claims are also intended to include plural forms, unless the context clearly indicates other meanings. It should also be understood that the term "and/or" as used herein refers to and includes any and all possible combinations of one or more of the associated listed items.

It should be understood that although the terms first, second, third, etc. may be used in the embodiments of the present disclosure to describe various information, such information should not be limited to these terms. These terms are only used to distinguish the same type of information from each other. For example, first information may also be referred to as second information, and similarly, the second information may also be referred to as the first information without departing from the scope of the embodiments of the present disclosure. Depending on the context, the word "if" as used herein can be interpreted as "at the time of", "when" or "in response to determining".

In 2018, the Institute of Electrical and Electronics Engineers (IEEE) 802.11 established a Study Group (SG) to study a next-generation mainstream Wi-Fi technology. The research scope includes: 320 MHz bandwidth transmission, aggregation and collaboration of a plurality of frequency bands, etc. Compared with the existing 802.11ax, at least a four-fold increase in the rate and throughput is proposed. Main application scenarios include video transmission, Augmented Reality (AR) transmission, Virtual Reality (VR) transmission, etc.

The aggregation of the plurality of frequency bands/links means that a device sends data in a plurality of frequency bands (such as 2.4 GHz, 5 GHz, and 6-7 GHz) at the same time, which has the following advantages: 1. throughput of an entire system (sending data with different contents in respective frequency bands/links) is improved; 2. a success rate of data sending/receiving (sending data with unified content in respective frequency bands/links) is improved.

To further improve the throughput of the system, in IEEE802.11be, some devices may support simultaneous sending and receiving (receiving and sending through a plurality of links do not interfere with each other), some devices may only support sending or receiving through multi-links (a plurality of links), and some devices may only support receiving or sending through single-link (a single link).

In the related art, a method for ensuring mutual non-interference in communication is proposed for the situation that there are devices with the above described capabilities in a Basic Service Set (BSS). The devices determine whether sending can be performed on a physical layer based on a channel energy detection (ED) mechanism, and determine whether sending can be performed on a Media Access Control (MAC) layer based on a Network Allocation Vector (NAV) mechanism. When an ED value is greater than or equal to a threshold, the NAV is set to be busy, and random backoff is performed. When the ED value is less than the threshold, the NAV is set to be idle, and sending is performed. However, the method only provides the setting of the NAV in the one link situation, and under the multi-link situation, especially for the devices with the three capabilities (simultaneous sending and receiving through multi-link, sending or receiving through multi-link, and sending or receiving through single-link) in the BSS, there is no specification on how the devices sense a channel and how the devices should set the NAV when the devices are about to send data.

Based on the above wireless communication system, the embodiments of the method of the present disclosure are provided which improve the utilization efficiency of spectrum without causing interference to other devices.

FIG. 1 is a flowchart illustrating a method for determining a network allocation vector under a multi-link communication situation according to an exemplary embodiment. The method for determining the network allocation vector under the multi-link communication situation is applied to a first device. The first device may be a Station (STA) device, specifically including a mobile terminal, a tablet, or other such devices, or an Access Point (AP) device, specifically including a router, a gateway, and other such devices. As shown in FIG. 1, the method for determining the network allocation vector under a multi-link communication situation includes steps S11~S13.

In step S11, a first data frame is generated for a first link in a plurality of links, where the plurality of links includes the first link;

In step S12, a capability information value of a second device in the plurality of links is obtained;

In step S13, a network allocation vector of the first device for the first link is set according to a capability information value of the first device and the capability information value of the second device.

The plurality of links here refer to multi-links, and the plurality of links may refer to links between the first device and the second device. The first device and the second device may be multi-link devices (MLDs), for example, the first device may be a STA MLD, and the second device may be an AP MLD, for another example, the first device may be an AP MLD, and the second device may be a STA MLD.

In the embodiments of the present disclosure, the second device may be a station device or an access point device.

In the embodiments of the present disclosure, the first data frame is a data frame generated by the first device.

In the embodiments of the present disclosure, the capability information, i.e., the capability information value of the first device or the capability information value of the second device, includes:

a first value, used to indicate that simultaneous sending and receiving through the plurality of links is supported; or, a second value, used to indicate that sending or receiving through the plurality of links is supported; or, a third value, used to indicate that sending or receiving through a single link is supported.

The first value, the second value and the third value are three different values. In practical application, the assigned value can be set or adjusted according to actual needs.

The BSS is a basic service set (BSS) established in the plurality of links (including 2.4 GHz, 5 GHz, and 6-7 GHz frequency bands, for example) or a basic service set (BSS) with the same or different bandwidths, such as 20 MHz, 40 MHz or 80 MHz bandwidth, established in any of the above three frequency bands.

The capability information value of the second device can be obtained by the first device from a signal domain (SIGNAL) in a physical header of a second data frame transmitted by the second device. The capability information value can be specifically identified by two bits, for example, "00" indicates sending or receiving through single-link, "01" indicates sending or receiving through multi-link, and "10" indicates sending and receiving through multi-link.

Figure 2:
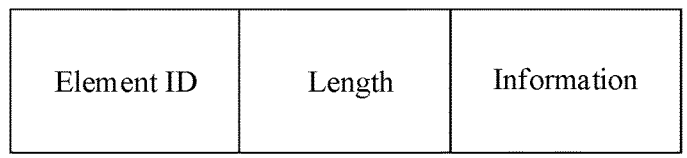
FIG. 2 is a schematic diagram illustrating a format of capability information according to an exemplary embodiment.

FIG. 2 shows a schematic diagram of a format of capability information. As shown in FIG. 2, the format of the capability information includes Element ID, Length and Information, where the Information indicates a specific value. For example, Information "00" indicates that the device only supports sending or receiving through single-link; Information "01" indicates that the device supports simultaneous sending or simultaneous receiving through multi-link; Information "10" indicates that the device supports simultaneous sending and receiving through multi-link.

In the embodiment, the acquisition manner of the capability information value is not limited.

In some embodiments, the access point device sends the capability information value through a beacon frame, or a probe response frame, or an association request frame, such as sending a capability information value indicating that the access point device supports simultaneous receiving and sending through multi-link.

In some embodiments, the station device sends the capability information value through a probe request frame or an association request frame, such as sending a capability information value indicating that the station device supports simultaneous sending and receiving through multi-link, sending a capability information value indicating that the station device supports simultaneous sending or simultaneous receiving through multi-link, or sending a capability information value indicating that the station device supports sending or receiving through single-link.

In the technical solutions according to the embodiments of the present disclosure, the first data frame is generated for the first link in a plurality of links, where the plurality of links includes the first link; the capability information value of the second device in the plurality of links is obtained; the network allocation vector of the first device for the first link is set according to the capability information value of the first device and the capability information value of the second device. In this way, the network allocation vector can be set based on the capability information value, so that the first device will not cause interference to the second device, therefore improving the utilization efficiency of spectrum.

In some embodiments, setting the network allocation vector of the first device for the first link according to the capability information value of the first device and the capability information value of the second device includes:

in a case that the capability information value of the first device is the first value, if the capability information value of the second device is the first value, and a transmission link of a second data frame is not the first link, determining a duration value of the network allocation vector of the first device for the first link to be 0, and setting the network allocation vector of the first device for the first link to be idle; where the second data frame is a data frame sent by the second device, sensed by the first device.

It can be seen that, if the first device wants to send the first data frame through one of the plurality of links, the first device will learn the capability information value of the second device in the plurality of links. If the capability information values of the first device and the second device are both the first value, and the transmission link of the second data frame is not the first link, the network allocation vector of the first device for the first link is set to idle, and the first data frame can be sent through an access channel, so that the first device will not cause interference to the second device.

In some embodiments, setting the network allocation vector of the first device for the first link according to the capability information value of the first device and the capability information value of the second device includes:

in a case that the capability information value of the first device is the first value, if the capability information value of the second device is the first value, and the transmission link of the second data frame is the first link, determining the duration value of the network allocation vector of the first device for the first link to be a frame length of the second data frame, and setting the network allocation vector of the first device for the first link to be busy; where the second data frame is a data frame sent by the second device, sensed by the first device.

It can be seen that, if the first device wants to send the first data frame through one of the plurality of links, the first device will learn the capability information value of the second device in the plurality of links. If the capability information values of the first device and the second device are both the first value, and the transmission link of the second data frame is the first link, the network allocation vector of the first device for the first link is set to be busy, and the first device needs to wait for the frame length of the second data frame before continuing to sense the access channel.

In some embodiments, setting the network allocation vector of the first device for the first link according to the capability information value of the first device and the capability information value of the second device includes:

in a case that the capability information value of the first device is the first value, if the capability information value of the second device is the second value, and a transmission link of a second data frame is the first link, when the second data frame is an uplink data frame or a downlink data frame, determining a duration value of the network allocation vector of the first device for the first link to be a frame length of the second data frame, and setting the network allocation vector of the first device for the first link to be busy.

It can be seen that, if the first device wants to send the first data frame through one of the plurality of links, the first device will learn the capability information value of the second device in the plurality of links. If the capability information value of the first device is the first value, the capability information value of the second device is the second value, and the transmission link of the second data frame is the first link, when the second data frame is an uplink data frame or a downlink data frame, the duration value of the network allocation vector of the first device for the first link is determined to be the frame length of the second data frame, and the network allocation vector of the first device for the first link is set to be busy, so the first device needs to wait for the frame length of the second data frame before continuing to sense the access channel.

In some embodiments, setting the network allocation vector of the first device for the first link according to the capability information value of the first device and the capability information value of the second device includes:

in a case that the capability information value of the first device is the first value, if the capability information value of the second device is the second value, and the transmission link of the second data frame is not the first link, when the second data frame is an uplink data frame, determining the duration value of the network allocation vector of the first device for the first link to be 0, and setting the network allocation vector of the first device for the first link to be idle; when the second data frame is a downlink data frame, determining the duration value of the network allocation vector of the first device for the first link to be the frame length of the second data frame, and setting the network allocation vector of the first device for the first link to be busy; where the second data frame is a data frame sent by the second device, sensed by the first device.

It can be seen that, if the first device wants to send the first data frame through one of the plurality of links, the first device will learn the capability information value of the second device in the plurality of links. If the capability information value of the first device is the first value, the capability information value of the second device is the second value, and the transmission link of the second data frame is not the first link, when the second data frame is an uplink data frame, the duration value of the network allocation vector of the first device for the first link is determined to be 0, and the network allocation vector of the first device for the first link is set to be idle; when the second data frame is a downlink data frame, the duration value of the network allocation vector of the first device for the first link is determined to be the frame length of the second data frame, and the network allocation vector of the first device for the first link is set to be busy, where the second data frame is a data frame sent by the second device, sensed by the first device, so the first device needs to wait for the frame length of the second data frame before continuing to sense the access channel.

In some embodiments, setting the network allocation vector of the first device for the first link according to the capability information value of the first device and the capability information value of the second device includes:

in a case that the capability information value of the first device is the first value, if the capability information value of the second device is the third value, and a transmission link of a second data frame is the first link, when the second data frame is an uplink data frame or a downlink data frame, determining a duration value of the network allocation vector of the first device for the first link to be a frame length of the second data frame, and setting the network allocation vector of the first device for the first link to be busy; where the second data frame is a data frame sent by the second device, sensed by the first device.

It can be seen that, if the first device wants to send the first data frame through one of the plurality of links, the first device will learn the capability information value of the second device in the plurality of links. If the capability information value of the first device is the first value, the capability information value of the second device is the third value, and the transmission link of the second data frame is the first link, when the second data frame is an uplink data frame or a downlink data frame, the duration value of the network allocation vector of the first device for the first link is determined to be the frame length of the second data frame, and the network allocation vector of the first device for the first link is set to be busy, so the first device needs to wait for the frame length of the second data frame before continuing to sense the access channel.

In some embodiments, setting the network allocation vector of the first device for the first link according to the capability information value of the first device and the capability information value of the second device includes:

in a case that the capability information value of the first device is the first value, if the capability information value of the second device is the third value, and the transmission link of the second data frame is not the first link, when the second data frame is an uplink data frame, determining the duration value of the network allocation vector of the first device for the first link to be 0, and setting the network allocation vector of the first device for the first link to be idle; when the second data frame is a downlink data frame, determining the duration value of the network allocation vector of the first device for the first link to be the frame length of the second data frame, and setting the network allocation vector of the first device for the first link to be busy; where the second data frame is a data frame sent by the second device, sensed by the first device.

It can be seen that, if the first device wants to send the first data frame through one of the plurality of links, the first device will learn the capability information value of the second device in the plurality of links. If the capability information value of the first device is the first value, the capability information value of the second device is the third value, and the transmission link of the second data frame is not the first link, when the second data frame is an uplink data frame, the duration value of the network allocation vector of the first device for the first link is determined to be 0, and the network allocation vector of the first device for the first link is set to be idle; when the second data frame is a downlink data frame, the duration value of the network allocation vector of the first device for the first link is determined to be the frame length of the second data frame, and the network allocation vector of the first device for the first link is set to be busy, so the first device needs to wait for the frame length of the second data frame before continuing to sense the access channel.

In some embodiments, setting the network allocation vector of the first device for the first link according to the capability information value of the first device and the capability information value of the second device includes:

in a case that the capability information value of the first device is the second value, if the capability information value of the second device is the first value, and a transmission link of a second data frame is not the first link, when the second data frame is an uplink data frame, determining a duration value of the network allocation vector of the first device for the first link to be 0, and setting the network allocation vector of the first device for the first link to be idle; when the second data frame is a downlink data frame, determining the duration value of the network allocation vector of the first device for the first link to be a frame length of the second data frame, and setting the network allocation vector of the first device for the first link to be busy; where the second data frame is a data frame sent by the second device, sensed by the first device.

It can be seen that, if the first device wants to send the first data frame through one of the plurality of links, the first device will learn the capability information value of the second device in the plurality of links. If the capability information value of the first device is the second value, the capability information value of the second device is the first value, and the transmission link of the second data frame is not the first link, the duration value of the network allocation vector of the first device for the first link is determined to be 0, and the network allocation vector of the first device for the first link is set to be idle, so that the first device will not cause interference to the second device.

In some embodiments, setting the network allocation vector of the first device for the first link according to the capability information value of the first device and the capability information value of the second device includes:

in a case that the capability information value of the first device is the second value, if the capability information value of the second device is the first value, and the transmission link of the second data frame is the first link, determining the duration value of the network allocation vector of the first device for the first link to be the frame length of the second data frame, and setting the network allocation vector of the first device for the first link to be busy; where the second data frame is a data frame sent by the second device, sensed by the first device.

It can be seen that, if the first device wants to send the first data frame through one of the plurality of links, the first device will learn the capability information value of the second device in the plurality of links. If the capability information value of the first device is the second value, the capability information value of the second device is the first value, and the transmission link of the second data frame is the first link, the duration value of the network allocation vector of the first device for the first link is determined to be the frame length of the second data frame, and the network allocation vector of the first device for the first link is set to be busy, so the first device needs to wait for the frame length of the second data frame before continuing to sense the access channel.

In some embodiments, setting the network allocation vector of the first device for the first link according to the capability information value of the first device and the capability information value of the second device includes:

in a case that the capability information value of the first device is the second value, if the capability information value of the second device is the second value, and a transmission link of a second data frame is the first link, when the second data frame is an uplink data frame or a downlink data frame, determining a duration value of the network allocation vector of the first device for the first link to be a frame length of the second data frame, and setting the network allocation vector of the first device for the first link to be busy; where the second data frame is a data frame sent by the second device, sensed by the first device.

It can be seen that, if the first device wants to send the first data frame through one of the plurality of links, the first device will learn the capability information value of the second device in the plurality of links. If the capability information value of the first device is the second value, the capability information value of the second device is the second value, and the transmission link of the second data frame is the first link, when the second data frame is an uplink data frame or a downlink data frame, the duration value of the network allocation vector of the first device for the first link is determined to be the frame length of the second data frame, and the network allocation vector of the first device for the first link is set to be busy, so the first device needs to wait for the frame length of the second data frame before continuing to sense the access channel.

In some embodiments, setting the network allocation vector of the first device for the first link according to the capability information value of the first device and the capability information value of the second device includes:

in a case that the capability information value of the first device is the second value, if the capability information value of the second device is the second value, and the transmission link of the second data frame is not the first link, when the second data frame is an uplink data frame, determining the duration value of the network allocation vector of the first device for the first link to be 0, and setting the network allocation vector of the first device for the first link to be idle; when the second data frame is a downlink data frame, determining the duration value of the network allocation vector of the first device for the first link to be the frame length of the second data frame, and setting the network allocation vector of the first device for the first link to be busy; where the second data frame is a data frame sent by the second device, sensed by the first device.

It can be seen that, if the first device wants to send the first data frame through one of the plurality of links, the first device will learn the capability information value of the second device in the plurality of links. If the capability information value of the first device is the second value, the capability information value of the second device is the second value, and the transmission link of the second data frame is not the first link, when the second data frame is an uplink data frame, the duration value of the network allocation vector of the first device for the first link is determined to be 0, and the network allocation vector of the first device for the first link is set to be idle; when the second data frame is a downlink data frame, the duration value of the network allocation vector of the first device for the first link is determined to be the frame length of the second data frame, and the network allocation vector of the first device for the first link is set to be busy, so the first device needs to wait for the frame length of the second data frame before continuing to sense the access channel.

In some embodiments, setting the network allocation vector of the first device for the first link according to the capability information value of the first device and the capability information value of the second device includes:

in a case that the capability information value of the first device is the second value, if the capability information value of the second device is the third value, and a transmission link of a second data frame is the first link, when the second data frame is an uplink data frame or a downlink data frame, determining a duration value of the network allocation vector of the first device for the first link to be a frame length of the second data frame, and setting the network allocation vector of the first device for the first link to be busy.

It can be seen that, if the first device wants to send the first data frame through one of the plurality of links, the first device will learn the capability information value of the second device in the plurality of links. If the capability information value of the first device is the second value, the capability information value of the second device is the third value, and the transmission link of the second data frame is the first link, when the second data frame is an uplink data frame or a downlink data frame, the duration value of the network allocation vector of the first device for the first link is determined to be the frame length of the second data frame, and the network allocation vector of the first device for the first link is set to be busy, so the first device needs to wait for the frame length of the second data frame before continuing to sense the access channel.

In some embodiments, setting the network allocation vector of the first device for the first link according to the capability information value of the first device and the capability information value of the second device includes:

in a case that the capability information value of the first device is the second value, if the capability information value of the second device is the third value, and the transmission link of the second data frame is not the first link, when the second data frame is an uplink data frame, determining the duration value of the network allocation vector of the first device for the first link to be 0, and setting the network allocation vector of the first device for the first link to be idle; when the second data frame is a downlink data frame, determining the duration value of the network allocation vector of the first device for the first link to be the frame length of the second data frame, and setting the network allocation vector of the first device for the first link to be busy; where the second data frame is a data frame sent by the second device, sensed by the first device.

It can be seen that, if the first device wants to send the first data frame through one of the plurality of links, the first device will learn the capability information value of the second device in the plurality of links. If the capability information value of the first device is the second value, the capability information value of the second device is the third value, and the transmission link of the second data frame is not the first link, when the second data frame is an uplink data frame, the duration value of the network allocation vector of the first device for the first link is determined to be 0, and the network allocation vector of the first device for the first link is set to be idle; when the second data frame is a downlink data frame, the duration value of the network allocation vector of the first device for the first link is determined to be the frame length of the second data frame, and the network allocation vector of the first device for the first link is set to be busy, so the first device needs to wait for the frame length of the second data frame before continuing to sense the access channel.

In some embodiments, the manner of determining whether the second data frame is an uplink data frame or a downlink data frame includes:

determining that the second data frame is an uplink data frame or a downlink data frame according to first preset bits carried in a signal domain in the second data frame sent by the second device.

In this way, whether the second data frame is an uplink data frame or a downlink data frame can be determined through the first preset bits in the signal domain, which helps to quickly identify whether the second data frame is uplink data or downlink data.

In some embodiments, obtaining the capability information value of the second device in the plurality of links includes:

determining the capability information value of the second device according to second preset bits carried in a signal domain in a second data frame or a management frame sent by the second device.

The second preset bits are bits different from the first preset bits.

In this way, the capability information value of the second device sending the second data frame can be determined through the second preset bits in the signal domain, which helps to quickly identify the capability information value of the second device.

Figure 3:
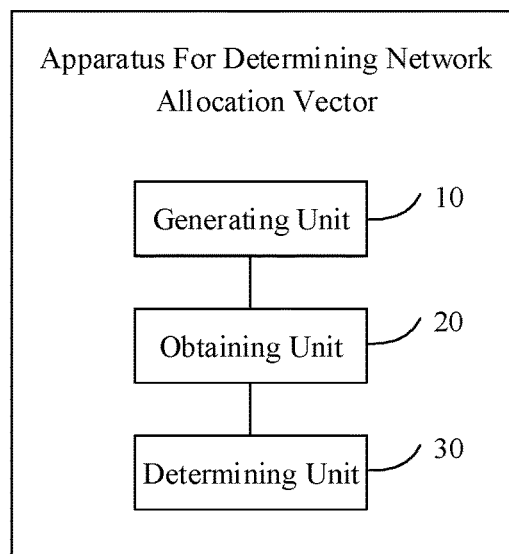
FIG. 3 is a block diagram illustrating an apparatus for determining a network allocation vector according to an exemplary embodiment.

FIG. 3 is a block diagram illustrating an apparatus for determining a network allocation vector under multi-link communication situations according to an exemplary embodiment. The apparatus for determining the network allocation vector under multi-link communication situations is applied to a first device side. Referring to FIG. 3, the apparatus includes a generating unit 10, an obtaining unit 20 and a determining unit 30.

The generating unit 10 is configured to generate a first data frame for a first link in a plurality of links, where the plurality of links includes the first link.

The obtaining unit 20 is configured to obtain a capability information value of a second device in the plurality of links.

The determining unit 30 is configured to determine a network allocation vector of the first device for the first link according to a capability information value of the first device and the capability information value of the second device.

In some embodiments, the capability information value includes one of:

a first value, used to indicate that simultaneous sending and receiving through the plurality of links is supported;

a second value, used to indicate that sending or receiving through the plurality of links is supported;

a third value, used to indicate that sending or receiving through a single link is supported.

In some embodiments, the determining unit 30 is configured to:

in a case that the capability information value of the first device is the first value, if the capability information value of the second device is the first value, and a transmission link of a second data frame is not the first link, determine a duration value of the network allocation vector of the first device for the first link to be 0, and set the network allocation vector of the first device for the first link to be idle;

or, if the capability information value of the second device is the first value, and the transmission link of the second data frame is the first link, determine the duration value of the network allocation vector of the first device for the first link to be a frame length of the second data frame, and set the network allocation vector of the first device for the first link to be busy;

where the second data frame is a data frame sent by the second device, sensed by the first device.

In some embodiments, the determining unit 30 is configured to:

in a case that the capability information value of the first device is the first value, if the capability information value of the second device is the second value, and a transmission link of a second data frame is the first link, when the second data frame is an uplink data frame or a downlink data frame, determine a duration value of the network allocation vector of the first device for the first link to be a frame length of the second data frame, and set the network allocation vector of the first device for the first link to be busy;

or, if the capability information value of the second device is the second value, and the transmission link of the second data frame is not the first link, when the second data frame is an uplink data frame, determine the duration value of the network allocation vector of the first device for the first link to be 0, and set the network allocation vector of the first device for the first link to be idle; when the second data frame is a downlink data frame, determine the duration value of the network allocation vector of the first device for the first link to be the frame length of the second data frame, and set the network allocation vector of the first device for the first link to be busy;

where the second data frame is a data frame sent by the second device, sensed by the first device.

In some embodiments, the determining unit 30 is configured to:

in a case that the capability information value of the first device is the first value, if the capability information value of the second device is the third value, and a transmission link of a second data frame is the first link, when the second data frame is an uplink data frame or a downlink data frame, determine a duration value of the network allocation vector of the first device for the first link to be a frame length of the second data frame, and set the network allocation vector of the first device for the first link to be busy;

or, if the capability information value of the second device is the third value, and the transmission link of the second data frame is not the first link, when the second data frame is an uplink data frame, determine the duration value of the network allocation vector of the first device for the first link to be 0, and set the network allocation vector of the first device for the first link to be idle; when the second data frame is a downlink data frame, determine the duration value of the network allocation vector of the first device for the first link to be the frame length of the second data frame, and set the network allocation vector of the first device for the first link to be busy;

where the second data frame is a data frame sent by the second device, sensed by the first device.

In some embodiments, the determining unit 30 is configured to:

in a case that the capability information value of the first device is the second value, if the capability information value of the second device is the first value, and a transmission link of a second data frame is not the first link, when the second data frame is an uplink data frame, determine a duration value of the network allocation vector of the first device for the first link to be 0, and set the network allocation vector of the first device for the first link to be idle; when the second data frame is a downlink data frame, determine the duration value of the network allocation vector of the first device for the first link to be a frame length of the second data frame, and set the network allocation vector of the first device for the first link to be busy;

or, if the capability information value of the second device is the first value, and the transmission link of the second data frame is the first link, determine the duration value of the network allocation vector of the first device for the first link to be the frame length of the second data frame, and set the network allocation vector of the first device for the first link to be busy;

where the second data frame is a data frame sent by the second device, sensed by the first device.

In some embodiments, the determining unit 30 is configured to:

in a case that the capability information value of the first device is the second value, if the capability information value of the second device is the second value, and a transmission link of a second data frame is the first link, when the second data frame is an uplink data frame or a downlink data frame, determine a duration value of the network allocation vector of the first device for the first link to be a frame length of the second data frame, and set the network allocation vector of the first device for the first link to be busy;

or, if the capability information value of the second device is the second value, and the transmission link of the second data frame is not the first link, when the second data frame is an uplink data frame, determine the duration value of the network allocation vector of the first device for the first link to be 0, and set the network allocation vector of the first device for the first link to be idle; when the second data frame is a downlink data frame, determine the duration value of the network allocation vector of the first device for the first link to be the frame length of the second data frame, and set the network allocation vector of the first device for the first link to be busy;

where the second data frame is a data frame sent by the second device, sensed by the first device.

In some embodiments, the determining unit 30 is configured to:

in a case that the capability information value of the first device is the second value, if the capability information value of the second device is the third value, and a transmission link of a second data frame is the first link, when the second data frame is an uplink data frame or a downlink data frame, determine a duration value of the network allocation vector of the first device for the first link to be a frame length of the second data frame, and set the network allocation vector of the first device for the first link to be busy;

or, if the capability information value of the second device is the third value, and the transmission link of the second data frame is not the first link, when the second data frame is an uplink data frame, determine the duration value of the network allocation vector of the first device for the first link to be 0, and set the network allocation vector of the first device for the first link to be idle; when the second data frame is a downlink data frame, determine the duration value of the network allocation vector of the first device for the first link to be the frame length of the second data frame, and set the network allocation vector of the first device for the first link to be busy;

where the second data frame is a data frame sent by the second device, sensed by the first device.

In some embodiments, the obtaining unit 20 is configured to:

determine that the second data frame is an uplink data frame or a downlink data frame according to first preset bits carried in a signal domain in the second data frame sent by the second device.

In some embodiments, the obtaining unit 20 is configured to:

determine the capability information value of the second device according to second preset bits carried in a signal domain in a second data frame or a management frame sent by the second device.

Regarding the apparatus in the above embodiments, the specific manner in which each module performs operations has been described in detail in the embodiments of the method, and will not be described in detail here.

In practical application, specific structures of the above generating unit 10, obtaining unit 20 and determining unit 30 can be implemented by the apparatus for determining the network allocation vector under multi-link communication or a Central Processing Unit (CPU), a Micro Controller Unit (MCU), a Digital Signal Processor (DSP) or a Programmable Logic Controller (PLC) etc. in a device to which the apparatus for determining the network allocation vector under multi-link communication belongs.

The apparatus for determining the network allocation vector under multi-link communication described in the embodiments may be set on the first device side.

It should be understood by those skilled in the art that functions of each processing module in the apparatus for determining the network allocation vector under multi-link communication situations according to the embodiments of the present disclosure can be understood by referring to the relevant description of the methods for determining the network allocation vector under multi-link communication situations. Each processing module in the apparatus for determining the network allocation vector under multi-link communication situations of the embodiments may be implemented by an analog circuit that realizes the functions described in the embodiments of the present disclosure, or may be implemented by running software that performs the functions described in the embodiments of the present disclosure on a terminal.

The apparatus for determining the network allocation vector under multi-link communication situations according to the embodiments of the present disclosure can set the network allocation vector based on the capability information value, so that the first device will not cause interference to the second device, therefore improving the utilization efficiency of spectrum.

The embodiments of the present application also provide an apparatus for determining a network allocation vector under multi-link communication situations. The apparatus includes: a memory, a processor, and a computer program stored in the memory and capable of running on the processor. When the processor executes the program, the method for determining the network allocation vector under multi-link communication according to any one of the above technical solutions is realized.

The embodiments of the present application also provide a computer storage medium having computer-executable instructions stored thereon, and the computer-executable instructions are used to perform the method for determining the network allocation vector under multi-link communication situations described in the above embodiments. That is, after the computer-executable instructions are executed by the processor, the method for determining the network allocation vector under multi-link communication situations according to any one of the above technical solutions can be implemented.

Those skilled in the art should understand that functions of each program in the computer storage medium of the embodiments can be understood by referring to the relevant description of the methods for determining the network allocation vector under multi-link communication situations described in the above embodiments.

Figure 4:
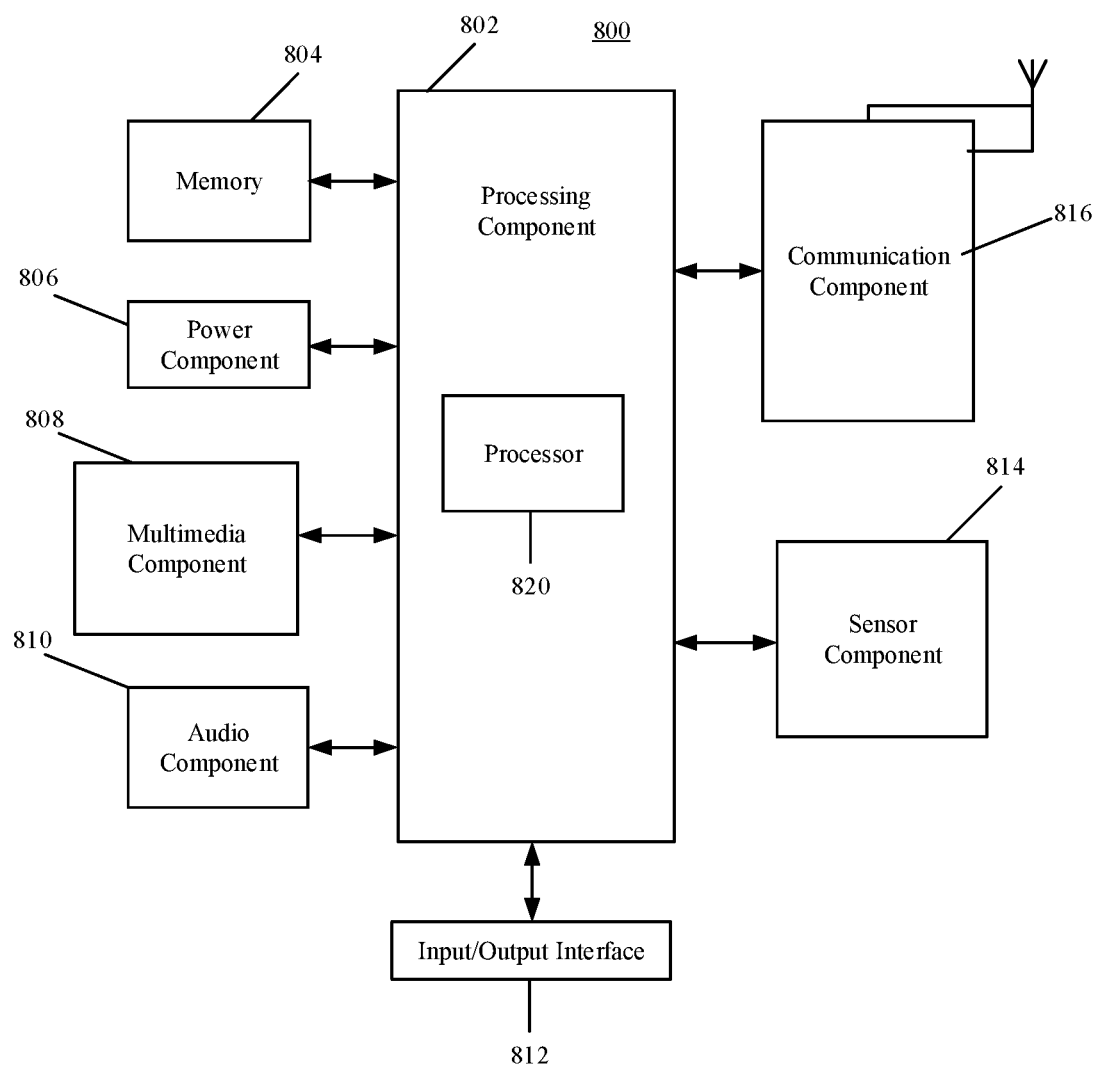
FIG. 4 is a block diagram illustrating an apparatus 800 for determining a network allocation vector under multi-link communication conditions according to an exemplary embodiment.

FIG. 4 is a block diagram illustrating an apparatus 800 for determining a network allocation vector under multi-link communication situations according to an exemplary embodiment. For example, the apparatus 800 may be a mobile phone, a computer, a digital broadcasting terminal, a messaging device, a game console, a tablet device, a medical device, a fitness device, a personal digital assistants, or the like.

Referring to FIG. 4, the apparatus 800 can include one or more of the following components: a processing component 802, a memory 804, a power component 806, a multimedia component 808, an audio component 810, an input/output (I/O) interface 812, a sensor component 814, and a communication component 816.

The processing component 802 generally controls the overall operations of the apparatus 800, such as operations associated with display, telephone calls, data communications, camera operations, and recording operations. The processing component 802 can include one or more processors 820 to execute instructions to complete all or part of the steps of the above methods. In addition, the processing component 802 can include one or more modules to facilitate interaction between the processing component 802 and other components. For example, the processing component 802 can include a multimedia module to facilitate interaction between the multimedia component 808 and the processing component 802.

The memory 804 is configured to store various types of data to support operations at the apparatus 800. Examples of such data include instructions for any application or method operating on the apparatus 800, contact data, phone book data, messages, pictures, videos, and so on. The memory 804 can be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power component 806 provides power to various components of the apparatus 800. The power component 806 can include a power management system, one or more power sources, and other components associated with generating, managing, and distributing power for the apparatus 800.

The multimedia component 808 includes a screen that provides an output interface between the apparatus 800 and a user. In some embodiments, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensor can not only sense boundaries of a touch or swipe action, but also detect the duration and pressure related to the touch or swipe action. In some embodiments, the multimedia component 808 includes a front camera and/or a rear camera. When the apparatus 800 is in an operation mode, such as a shooting mode or a video mode, the front camera and/or the rear camera can receive external multimedia data. Each of the front and rear cameras can be a fixed optical lens system or have focal length and optical zooming capabilities.

The audio component 810 is configured to output and/or input audio signals. For example, the audio component 810 includes a microphone (MIC) that is configured to receive external audio signals when the apparatus 800 is in an operation mode, such as a call mode, a recording mode, and a voice recognition mode. The received audio signals can be further stored in the memory 804 or transmitted via the communication component 816. In some embodiments, the audio component 810 further includes a speaker for outputting audio signals.

The I/O interface 812 provides an interface between the processing component 802 and peripheral interface modules. The peripheral interface modules can be keyboards, a click wheels, a buttons, or the like. These buttons can include, but are not limited to, home button, volume button, start button, and lock button.

The sensor component 814 includes one or more sensors for providing the apparatus 800 with status assessment in various aspects. For example, the sensor component 814 can detect an open/closed state of the apparatus 800, relative positioning of components, such as the display and keypad of the apparatus 800. The sensor component 814 can also detect a change in position of the apparatus 800 or a component of the apparatus 800, the presence or absence of user contact with the apparatus 800, orientation or acceleration/deceleration of the apparatus 800, and temperature change of the apparatus 800. The sensor component 814 can include a proximity sensor configured to detect the presence of nearby objects without any physical contact. The sensor assembly 814 can also include a light sensor, such as a Complementary Metal-Oxide-Semiconductor (CMOS) or Charged Coupled Device (CCD) image sensor, for use in imaging applications. In some embodiments, the sensor component 814 can further include an acceleration sensor, a gyro sensor, a magnetic sensor, a pressure sensor, or a temperature sensor.

The communication component 816 is configured to facilitate wired or wireless communication between the apparatus 800 and other devices. The apparatus 800 can access a wireless network based on a communication standard, such as Wi-Fi, 2G or 3G, or a combination thereof. In an exemplary embodiment, the communication component 816 receives broadcast signals or broadcast-related information from an external broadcast management system via a broadcast channel. In one exemplary embodiment, the communication component 816 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 800 can be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components for performing the method for determining the network allocation vector as described in any one of the above embodiments.

In an exemplary embodiment, there is also provided a non-transitory computer-readable storage medium including executable instructions, such as the memory 804 including executable instructions executable by the processor 820 of the apparatus 800 to implement the above methods. For example, the non-transitory computer-readable storage medium can be a ROM, a random access memory (RAM), a CD-ROM, a magnetic tape, a floppy disk, and an optical data storage device, etc.

Figure 5:
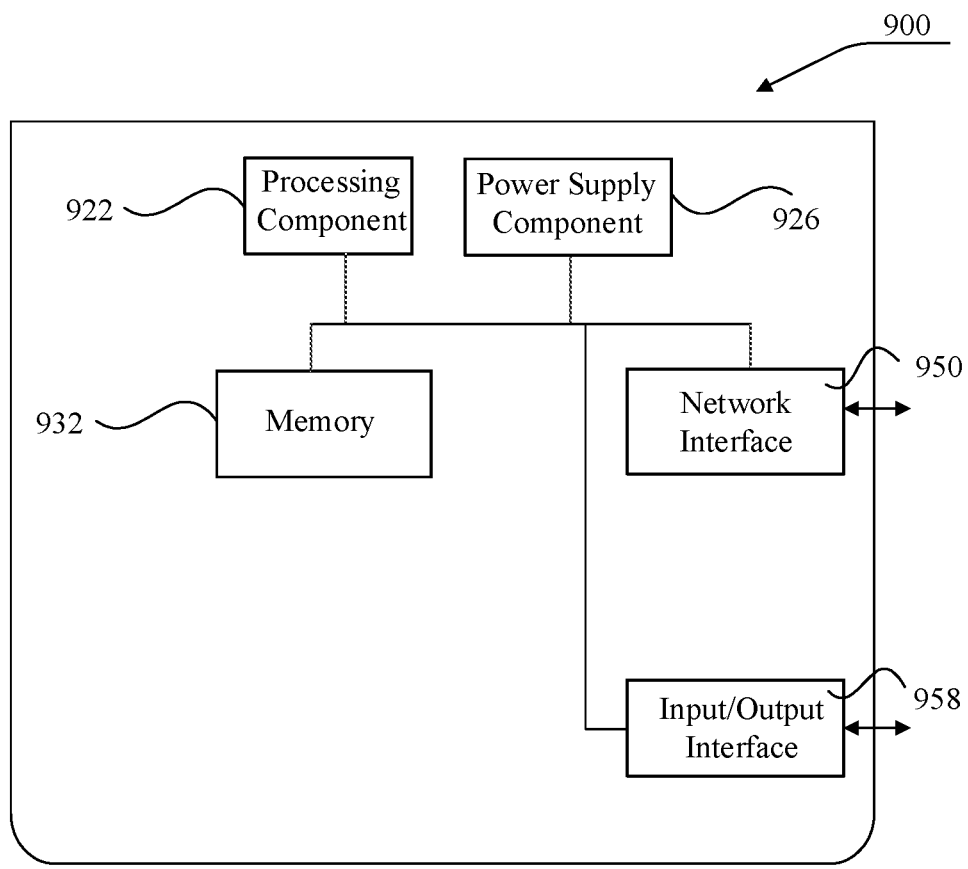
FIG. 5 is a block diagram illustrating an apparatus 900 for determining a network allocation vector under multi-link communication conditions according to an exemplary embodiment.

FIG. 5 is a block diagram illustrating an apparatus 900 for determining a network allocation vector under multi-link communication situations according to an exemplary embodiment. For example, the apparatus 900 may be provided as a server. Referring to FIG. 5, the apparatus 900 includes a processing component 922, which further includes one or more processors, and a memory resource represented by a memory 932 for storing instructions executable by the processing component 922, such as an application program. The application program stored in memory 932 may include one or more modules, each corresponding to a set of instructions. In addition, the processing component 922 is configured to execute the instructions to perform the above-described methods for determining the network allocation vector under multi-link communication situations.

The apparatus 900 may also include a power supply component 926 configured to perform power management of THE apparatus 900, a wired or wireless network interface 950 configured to connect the apparatus 900 to a network, and an input/output (I/O) interface 958. The apparatus 900 may operate based on an operating system stored in the memory 932, such as Windows Server™ Mac OS X™, Unix™, Linux™, FreeBSD™ or the like.

The technical solutions described in the embodiments of the present disclosure may be combined arbitrarily if there is no conflict.

Those skilled in the art will readily recognize other embodiments of the present disclosure upon consideration of the specification and practice of the present disclosure disclosed herein. The present disclosure is intended to cover any variations, uses, or adaptations of the present disclosure, which follow general principles of the present disclosure and include common knowledge or customary means in the art that are not disclosed in the present disclosure. The specification and embodiments are exemplary only, with the true scope and spirit of the present disclosure being indicated by the following claims.

It should be understood that the present disclosure is not limited to the precise structure that has been described above and shown in the drawings, and various modifications and changes may be made without departing from the scope thereof. The scope of the present disclosure is limited only by the appended claims.

The invention claimed is:

1. A method for determining a network allocation vector, applied to a first device, the method comprising:
   generating a first data frame for a first link in a plurality of links, wherein the plurality of links includes the first link;
   obtaining a capability information value of a second device in the plurality of links;
   setting a network allocation vector of the first device for the first link according to a capability information value of the first device and the capability information value of the second device;
   wherein the capability information value of the first device and/or the capability information value of the second device includes one of:
   a first value, used to indicate that simultaneous sending and receiving through the plurality of links is supported;
   a second value, used to indicate that sending or receiving through the plurality of links is supported; or,
   a third value, used to indicate that sending or receiving through a single link of the plurality of links is supported;
   wherein setting the network allocation vector of the first device for the first link according to the capability information value of the first device and the capability information value of the second device comprises:
   in a case that the capability information value of the first device is the first value, if the capability information value of the second device is the first value, and a transmission link of a second data frame is not the first link, determining a duration value of the network allocation vector of the first device for the first link to be 0, and setting the network allocation vector of the first device for the first link to be idle; or,
   in a case that the capability information value of the first device is the first value, if the capability information value of the second device is the first value, and the transmission link of the second data frame is the first link, determining the duration value of the network allocation vector of the first device for the first link to be a frame length of the second data frame, and setting the network allocation vector of the first device for the first link to be busy; or
   in a case that the capability information value of the first device is the second value, if the capability information value of the second device is the first value, and the transmission link of the second data frame is not the first link, when the second data frame is an uplink data frame, determining the duration value of the network allocation vector of the first device for the first link to be 0, and setting the network allocation vector of the first device for the first link to be idle; when the second data frame is a downlink data frame, determining the duration value of the network allocation vector of the first device for the first link to be has been replaced with "the frame length of the second data frame, and setting the network allocation vector of the first device for the first link to be busy; or, in a case that the capability information value of the first device is the second value, if the capability information value of the second device is the first value, and the transmission link of the second data frame is the first link, determining the duration value of the network allocation vector of the first device for the first link to be the frame length of the second data frame, and setting the network allocation vector of the first device for the first link to be busy;

wherein the second data frame is a data frame sent by the second device, sensed by the first device.

2. The method according to claim 1, wherein obtaining the capability information value of the second device in the plurality of links comprises:

determining the capability information value of the second device according to second preset bits carried in the second data frame or a management frame sent by the second device.

3. A communication device, comprising:
a processor;
a memory configured to store instructions executable by the processor,
wherein the processor is configured to execute the instructions, wherein the instructions cause the communication device to act as the first device and perform the method according to claim 1.

4. A non-transitory computer readable storage medium having executable instructions stored thereon, wherein when executed by a processor, the executable instructions causes the processor to perform the method according to claim 1.

5. The method according to claim 1, wherein whether the second data frame is the uplink data frame or the downlink data frame is determined by:

determining that the second data frame is the uplink data frame or the downlink data frame according to first preset bits carried in the second data frame sent by the second device.

6. A method for determining a network allocation vector, applied to a first device, the method comprising:

generating a first data frame for a first link in a plurality of links, wherein the plurality of links includes the first link;

obtaining a capability information value of a second device in the plurality of links;

setting a network allocation vector of the first device for the first link according to a capability information value of the first device and the capability information value of the second device;

wherein the capability information value of the first device and/or the capability information value of the second device includes one of:

a first value, used to indicate that simultaneous sending and receiving through the plurality of links is supported;

a second value, used to indicate that sending or receiving through the plurality of links is supported; or, a third value, used to indicate that sending or receiving through a single link of the plurality of links is supported;

wherein setting the network allocation vector of the first device for the first link according to the capability information value of the first device and the capability information value of the second device comprises:

in a case that the capability information value of the first device is the first value, if the capability information value of the second device is the second value, and a transmission link of a second data frame is the first link, when the second data frame is an uplink data frame or a downlink data frame, determining a duration value of the network allocation vector of the first device for the first link to be a frame length of the second data frame, and setting the network allocation vector of the first device for the first link to be busy; or, in a case that the capability information value of the first device is the first value, if the capability information value of the second device is the second value, and the transmission link of the second data frame is not the first link, when the second data frame is an uplink data frame, determining the duration value of the network allocation vector of the first device for the first link to be 0, and setting the network allocation vector of the first device for the first link to be idle; when the second data frame is a downlink data frame, determining the duration value of the network allocation vector of the first device for the first link to be the frame length of the second data frame, and setting the network allocation vector of the first device for the first link to be busy; or in a case that the capability information value of the first device is the second value, if the capability information value of the second device is the second value, and the transmission link of the second data frame is the first link, when the second data frame is an uplink data frame or a downlink data frame, determining the duration value of the network allocation vector of the first device for the first link to be the frame length of the second data frame, and setting the network allocation vector of the first device for the first link to be busy; or, in a case that the capability information value of the first device is the second value, if the capability information value of the second device is the second value, and the transmission link of the second data frame is not the first link, when the second data frame is an uplink data frame, determining the duration value of the network allocation vector of the first device for the first link to be 0, and setting the network allocation vector of the first device for the first link to be idle; when the second data frame is a downlink data frame, determining the duration value of the network allocation vector of the first device for the first link to be the frame length of the second data frame, and setting the network allocation vector of the first device for the first link to be busy;

wherein the second data frame is a data frame sent by the second device, sensed by the first device.

7. The method according to claim 6, wherein whether the second data frame is the uplink data frame or the downlink data frame is determined by:

determining that the second data frame is the uplink data frame or the downlink data frame according to first preset bits carried in the second data frame sent by the second device.

8. The method according to claim 6, wherein obtaining the capability information value of the second device in the plurality of links comprises:

determining the capability information value of the second device according to second preset bits carried in the second data frame or a management frame sent by the second device.

9. A communication device, comprising:
a processor;

a memory configured to store instructions executable by the processor, wherein the processor is configured to execute the instructions, wherein the instructions cause the communication device to act as the first device and perform the method according to claim 6.

10. A non-transitory computer readable storage medium having executable instructions stored thereon, wherein when executed by a processor, the executable instructions causes the processor to perform the method according to claim 6.

11. A method for determining a network allocation vector, applied to a first device, the method comprising:

generating a first data frame for a first link in a plurality of links, wherein the plurality of links includes the first link;

obtaining a capability information value of a second device in the plurality of links;

setting a network allocation vector of the first device for the first link according to a capability information value of the first device and the capability information value of the second device;

wherein the capability information value of the first device and/or the capability information value of the second device includes one of:

a first value, used to indicate that simultaneous sending and receiving through the plurality of links is supported;

a second value, used to indicate that sending or receiving through the plurality of links is supported; or, a third value, used to indicate that sending or receiving through a single link of the plurality of links is supported;

wherein setting the network allocation vector of the first device for the first link according to the capability information value of the first device and the capability information value of the second device comprises:

in a case that the capability information value of the first device is the first value, if the capability information value of the second device is the third value, and a transmission link of a second data frame is the first link, when the second data frame is an uplink data frame or a downlink data frame, determining a duration value of the network allocation vector of the first device for the first link to be a frame length of the second data frame, and setting the network allocation vector of the first device for the first link to be busy; or, in a case that the capability information value of the first device is the first value, if the capability information value of the second device is the third value, and the transmission link of the second data frame is not the first link, when the second data frame is the uplink data frame, determining the duration value of the network allocation vector of the first device for the first link to be 0, and setting the network allocation vector of the first device for the first link to be idle; when the second data frame is the downlink data frame, determining the duration value of the network allocation vector of the first device for the first link to be the frame length of the second data frame, and setting the network allocation vector of the first device for the first link to be busy; or in a case that the capability information value of the first device is the second value, if the capability information value of the second device is the third value, and the transmission link of the second data frame is the first link, when the second data frame is the uplink data frame or the downlink data frame, determining the duration value of the network allocation vector of the first device for the first link to be the frame length of the second data frame, and setting the network allocation vector of the first device for the first link to be busy; or, in a case that the capability information value of the first device is the second value, if the capability information value of the second device is the third value, and the transmission link of the second data frame is not the first link, when the second data frame is the uplink data frame, determining the duration value of the network allocation vector of the first device for the first link to be 0, and setting the network allocation vector of the first device for the first link to be idle; when the second data frame is the downlink data frame, determining the duration value of the network allocation vector of the first device for the first link to be the frame length of the second data frame, and setting the network allocation vector of the first device for the first link to be busy;

wherein the second data frame is a data frame sent by the second device, sensed by the first device.

12. The method according to claim 11, wherein whether the second data frame is the uplink data frame or the downlink data frame is determined by:

determining that the second data frame is the uplink data frame or the downlink data frame according to first preset bits carried in the second data frame sent by the second device.

13. The method according to claim 11, wherein obtaining the capability information value of the second device in the plurality of links comprises:

determining the capability information value of the second device according to second preset bits carried in the second data frame or a management frame sent by the second device.

14. A communication device, comprising:

a processor;

a memory configured to store instructions executable by the processor, wherein the processor is configured to execute the instructions, wherein the instructions cause the communication device to act as the first device and perform the method according to claim 11.

15. A non-transitory computer readable storage medium having executable instructions stored thereon, wherein when executed by a processor, the executable instructions causes the processor to perform the method according to claim 11.

* * * * *